US 11,088,967 B2

(12) United States Patent
Das Sharma et al.

(10) Patent No.: US 11,088,967 B2
(45) Date of Patent: Aug. 10, 2021

(54) SHARED RESOURCES FOR MULTIPLE COMMUNICATION TRAFFICS

(71) Applicant: Intel Corporation, Santa Clara, CA (US)

(72) Inventors: Debendra Das Sharma, Saratoga, CA (US); Swadesh Choudhary, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 16/525,329

(22) Filed: Jul. 29, 2019

(65) Prior Publication Data
US 2019/0356611 A1    Nov. 21, 2019

Related U.S. Application Data

(60) Provisional application No. 62/839,471, filed on Apr. 26, 2019.

(51) Int. Cl.
*H04L 12/861*    (2013.01)
*H04L 12/40*     (2006.01)

(52) U.S. Cl.
CPC .......... *H04L 49/9005* (2013.01); *H04L 12/40* (2013.01)

(58) Field of Classification Search
CPC .................................................. H04L 49/9005
See application file for complete search history.

(56) References Cited

U.S. PATENT DOCUMENTS

| | | | | |
|---|---|---|---|---|
| 6,389,031 B1 * | 5/2002 | Chao | ...................... | H04L 47/10 370/412 |
| 6,834,053 B1 * | 12/2004 | Stacey | ..................... | H04L 47/30 370/395.4 |
| 7,283,468 B1 * | 10/2007 | Hill | ........................ | H04L 45/302 370/229 |
| 7,852,757 B1 | 12/2010 | Puranik | | |
| 7,925,756 B1 * | 4/2011 | Riddle | ..................... | H04L 47/10 709/226 |

(Continued)

OTHER PUBLICATIONS

European Patent Office—Extended European Search Report dated Jun. 4, 2020 from European Patent Application No. J2117028EPP00Pe, 8 pages.

*Primary Examiner* — Andrew Lai
*Assistant Examiner* — Andrew C Lee
(74) *Attorney, Agent, or Firm* — Green, Howard & Mughal LLP.; Christopher K. Gagne

(57) ABSTRACT

Systems, methods, and computer-readable media are disclosed for an apparatus coupled to a communication bus, where the apparatus includes a queue and a controller to manage operations of the queue. The queue includes a first space to store a first information for a first traffic type, with a first flow class, and for a first virtual channel of communication between a first communicating entity and a second communicating entity. The queue further includes a second space to store a second information for a second traffic type, with a second flow class, and for a second virtual channel of communication between a third communicating entity and a fourth communicating entity. The first traffic type is different from the second traffic type, the first flow class is different from the second flow class, or the first virtual channel is different from the second virtual channel. Other embodiments may be described and/or claimed.

20 Claims, 9 Drawing Sheets

(56) References Cited

U.S. PATENT DOCUMENTS

| | | | | |
|---|---|---|---|---|
| 9,154,455 | B1* | 10/2015 | Dropps | H04L 47/31 |
| 10,628,547 | B1* | 4/2020 | Swarbrick | G06F 30/394 |
| 2005/0281196 | A1* | 12/2005 | Tornetta | H04L 45/60 |
| | | | | 370/235 |
| 2006/0005021 | A1* | 1/2006 | Torrubia-Saez | H04K 1/00 |
| | | | | 713/167 |
| 2011/0058573 | A1* | 3/2011 | Balakavi | H04L 12/66 |
| | | | | 370/463 |
| 2016/0182391 | A1 | 6/2016 | Theobald et al. | |
| 2017/0126549 | A1* | 5/2017 | Paramasivam | H04L 49/9005 |
| 2017/0373879 | A1* | 12/2017 | Zhang | H04L 12/40 |
| 2019/0044809 | A1* | 2/2019 | Willis | G06F 3/0629 |
| 2020/0057737 | A1* | 2/2020 | Chidambaram Nachiappan | |
| | | | | G06F 13/366 |
| 2020/0236578 | A1* | 7/2020 | Cakulev | H04W 76/11 |

* cited by examiner

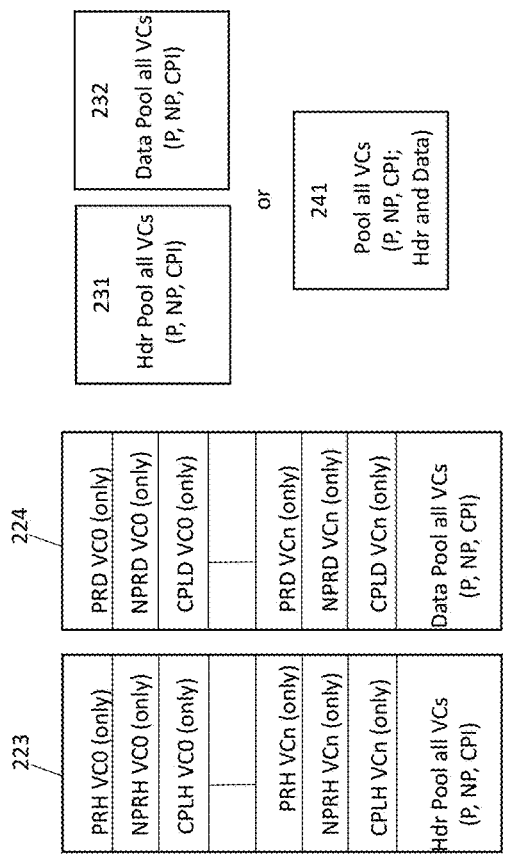
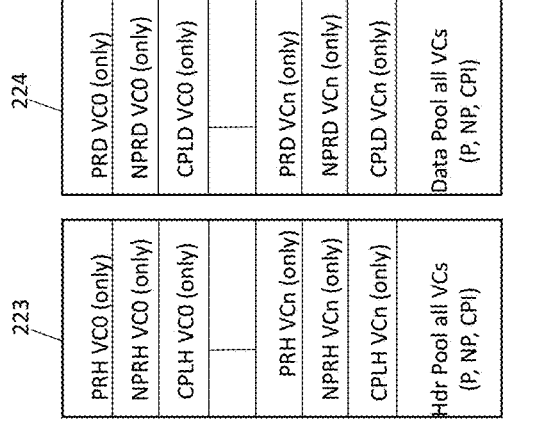
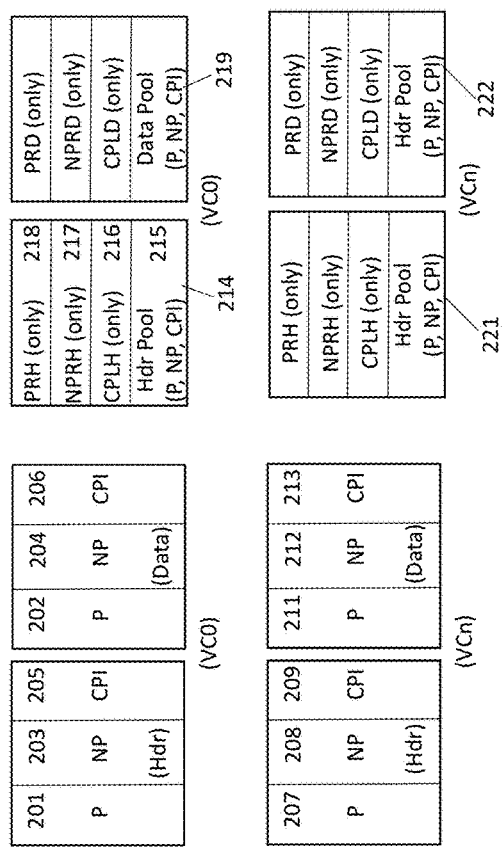

Figure 2(a)
(Existing approach: Separate Credit structures between FC, VC, Hdr vs Data)

Figure 2(b)
(Proposed approach 1: Separate credit structures between VC and Hdr vs Data but a shared pool between VC along with small amount of dedicated space for each FC)

Figure 2(c)
(Proposed approach 2: Separate credit structures between Hdr vs Data but a shared pool across VC and FC along with a small amount of dedicated space for each FC/VC)

Figure 2(d)
(Proposed approach 3: Separate or shared credit structures between Hdr vs Data with shared pool across VC/FC. The transmitter is responsible for guaranteed credit allocation across FC/VC to ensure QoS and forward progress)

SHARED RESOURCES FOR MULTIPLE COMMUNICATION TRAFFICS

RELATED APPLICATIONS

The present application claims priority under 35 U.S.C. § 119 to U.S. Provisional Application No. 62/839,471 filed on Apr. 26, 2019, the contents of which are hereby incorporated by reference in their entireties.

FIELD

Various embodiments generally may relate to the field of communication and computing, and in particular, may relate to a computer bus and devices coupled by a computer bus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computer system, or a platform, may include many components, such as a host including a central processing unit (CPU), memory, chipsets, and/or many other devices coupled together by a computer bus. A computer bus or a communication bus is a communication system that may transfer data between devices or components inside a computer, or between computers. A computing system or a platform may use various devices coupled to a computer bus extensively. A computer bus may include related hardware components (wire, optical fiber, etc.) and software, including communication protocols. There may be many kinds of computer bus, such as serial buses or parallel buses. Examples of serial bus include but are not limited to the peripheral component interconnect (PCI) bus, including PCIx and PCI Express (PCIe), and Universal Serial Bus (USB).

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 2(a)-2(d) illustrate example resources sharing across multiple communication traffics of different flow-control classes and virtual channels in computer buses, in accordance with various embodiments.

DETAILED DESCRIPTION

Figure 1A:
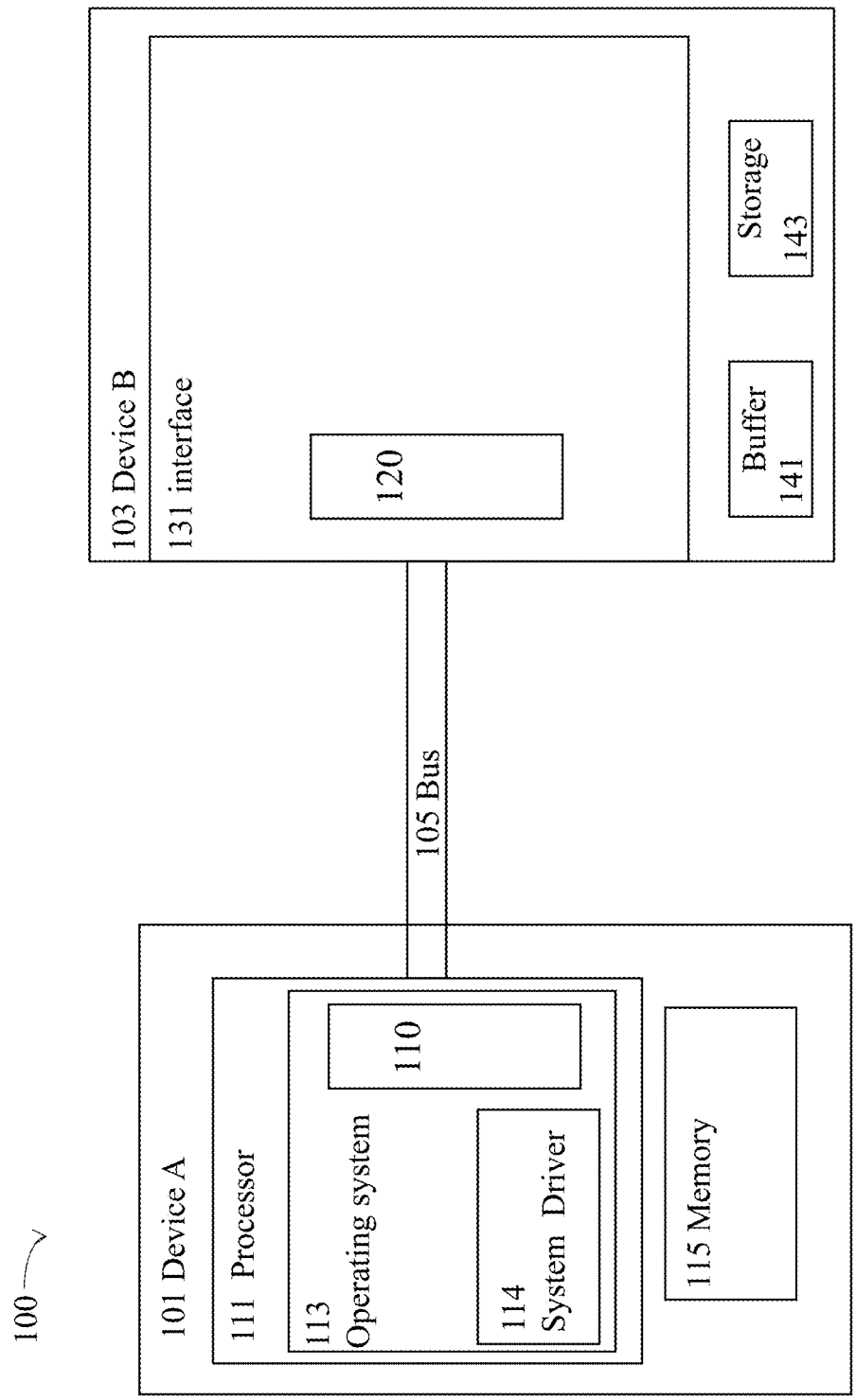
FIGS. 1(a)-1(b) illustrate example apparatuses including a device coupled to another device by a computer bus, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

A computing system or a platform may use various devices coupled to a computer bus, a communication bus, or a bus, extensively. A computer bus may include hardware components (wire, optical fiber, etc.) and associated software, including communication protocols. A peripheral component interconnect (PCI) bus or a PCI Express (PCIe, PCI-E) may be a computer bus based on PCI specifications that provide for mechanisms including system software, or a system driver, to perform various communication operations between device coupled to the PCI bus or the PCIe bus. Devices, or components coupled to a computer bus may have multiple functions and/or accessed by applications. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an 802.11 Wi-Fi card, use a single-lane (×1) link, while a graphics adapter typically uses a much wider and faster 16-lane link.

In the description below, a PCI bus or a PCIe bus may be used as an example of a computer bus, a communication bus, or a bus. Similarly, a PCI device or a PCIe device may be used as an example of a device coupled to a computer bus, a communication bus, or a bus. However, the present disclosure is not limited to PCI devices or buses. Descriptions about a PCIe device may be applicable to any other device coupled to any computer bus, communication bus, or bus.

Embodiments disclosed herein include an apparatus for communication, where the apparatus includes a queue and a controller coupled to the queue to manage operations of the queue. The apparatus is coupled to another apparatus via a communication bus. A first communicating entity is to communicate with a second communicating entity via the two apparatuses and the communication bus, and a third communicating entity is to communicate with a fourth communicating entity via the two apparatuses and the communication bus. The queue has a plurality of storage spaces.

For example, the queue includes a first space to store a first information for a first traffic type, with a first flow class, and for a first virtual channel (VC) of communication between the first communicating entity and the second communicating entity. The queue further includes a second space to store a second information for a second traffic type, with a second flow class, and for a second virtual channel of communication between the third communicating entity and the fourth communicating entity. The first traffic type is different from the second traffic type, the first flow class is different from the second flow class, or the first virtual channel is different from the second virtual channel.

Embodiments disclosed herein include a method for communication between a transmitter and a receiver coupled with each other via a bus. The method includes sending, by the transmitter, a request to the receiver for an amount of reserved storage spaces of a queue within the receiver. The queue has a plurality of storage spaces, each storage space being used to store information for a traffic type, with a flow class, and for a virtual channel for communications between the transmitter and the receiver. The method further includes receiving, by the transmitter, from the receiver, in response to the sent request, an indication of the amount of reserved spaces.

Embodiments disclosed herein include an apparatus for computing. The apparatus includes a printed circuit board (PCB) having a selected one of peripheral component interconnect (PCI) bus, a PCI Extended bus (PCI-X), or a PCI express bus. The apparatus further includes a first bus agent disposed on the PCB, and coupled to the bus, and a second bus agent disposed on the PCB, and coupled to the bus. At least a select one of the first or the second bus agent includes a queue, and a controller coupled to the queue to manage operations of the queue. The queue includes a plurality of storage spaces. In detail, the queue includes a first space to store a first information for a first traffic type, with a first flow class, and for a first virtual channel of communication between the first and second bus agents. The queue further includes a second space to store a second information for a second traffic type, with a second flow class, and for a second virtual channel of communication between the first and second bus agents. The first traffic type is different from the second traffic type, the first flow class is different from the second flow class, or the first virtual channel is different from the second virtual channel.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. The term "RSU" may refer to any transportation infrastructure entity implemented in an gNB/eNB or a stationary (or relatively stationary) UE. An RSU implemented in a UE may be referred to as a "UE-type RSU" and an RSU implemented in an eNB may be referred to as an "eNB-type RSU." As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

Figure 1B:
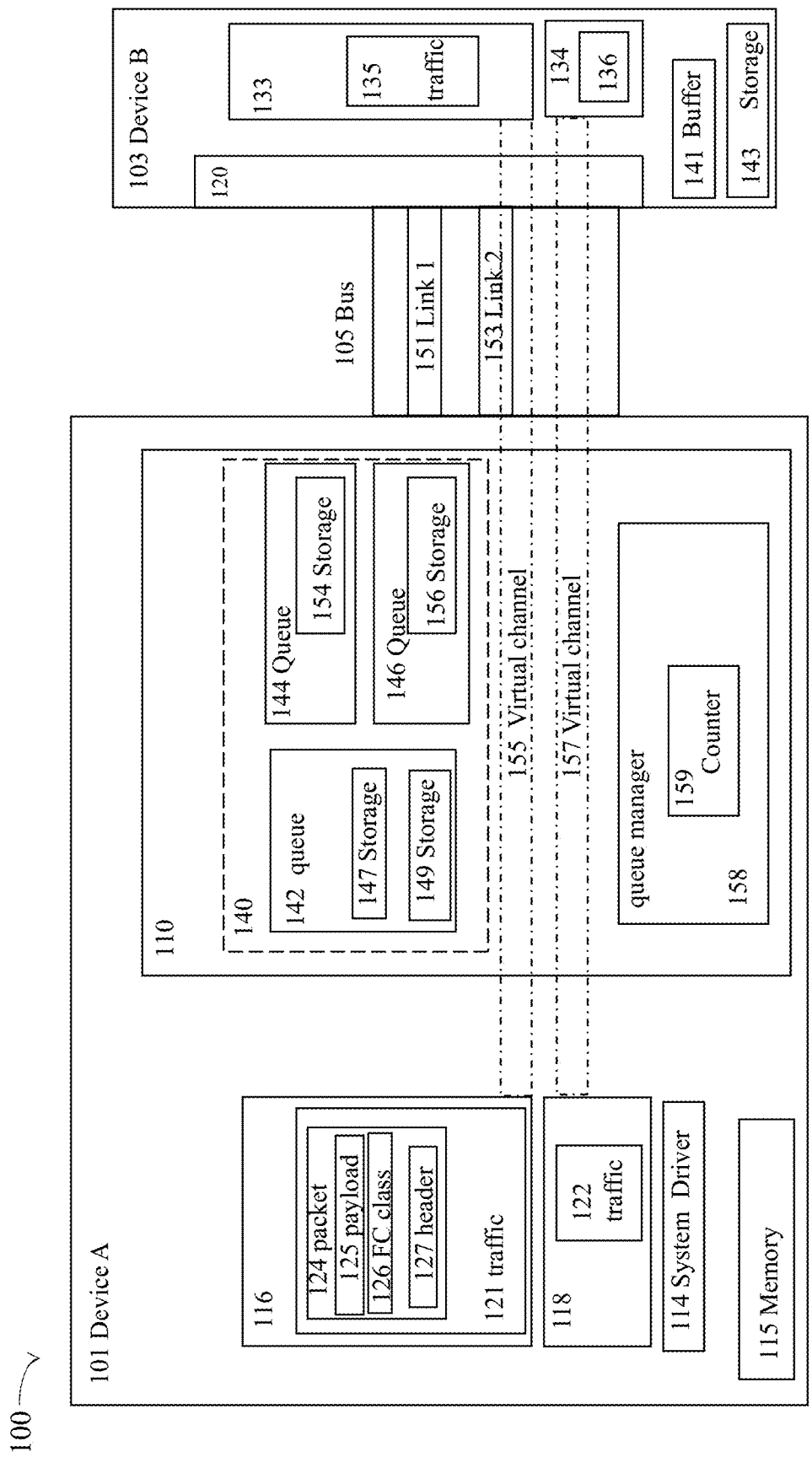

FIGS. 1(a)-1(b) illustrate example apparatuses 100 including a device 101 coupled to another device 103 by a computer bus 105, in accordance with various embodiments. For clarity, features of the apparatus 100, the device 101, the device 103, and the computer bus 105, are described below as an example. It is to be understood that there may be more or fewer components included in the apparatus 100, the device 101, the device 103, and the computer bus 105. Further, it is to be understood that one or more of the devices and components within the apparatus 100 may include additional and/or varying features from the description below, and may include any device that one having ordinary skill in the art would consider and/or refer to as a host, a device, and a computer bus. In some embodiments, the apparatus 100 is a computer or a computing device, while the device 101 and the device 103 are both within the computer enclosed by a common case or cover. For these embodiments, devices 101 and 103 may also be referred to as components. In some other embodiments, the device 101 and the device 103 may be between computers. Regardless, processor 111 and interface 131 are incorporated with the shared resource for communication traffic technology of the present disclosure, e.g., an apparatus 110, or an apparatus 120, to be described more fully below, after the further general description of devices 101 and 103.

In embodiments, as shown in FIG. 1(a), the device 101 may include the processor 111 and a memory 115. An operating system 113 may operate on the processor 111, and may include a system driver 114. The device 103 may be coupled to the processor 101 by the computer bus 105. The device 103 may include an interface 131 coupled to the computer bus 105, a buffer 141, and a storage 143. The interface 131 may include one or more registers, such as a capability header register, an authentication header register, an authentication capability register, an authentication status register, an authentication control register, a write data mailbox register, a read data mailbox register, or some other registers.

In embodiments, the apparatus 100 may be any computing system or platform, for example, a laptop computer, an ultra-laptop computer, a tablet, a touch pad, a portable computer, a handheld computer, a wearable device, a palmtop computer, a personal digital assistant (PDA), an e-reader, a cellular telephone, a combination cellular telephone/PDA, a mobile smart device (e.g., a smart phone, a smart tablet, etc.), a mobile internet device (MID), a mobile messaging device, a mobile data communication device, a mobile media playing device, a camera, a mobile gaming console, etc. In embodiments, the apparatus 100 may also be a non-mobile device that may include, but is not to be limited to, for example, a personal computer (PC), a television, a smart television, a data communication device, a media playing device, a gaming console, a gateway, an Internet of Things (IOT) device, etc. The apparatus 100 may include controllers (or processors) and other components that execute software and/or control hardware to execute local programs or consume services provided by external service providers over a network. For example, the apparatus 100 may include one or more software clients or applications that run locally and/or utilize or access web-based services (e.g., online stores or services, social networking services, etc.). The apparatus 100 may also, or instead, include a web interface running in a browser from which the electronic apparatus can access such web-based services. The apparatus 100 may also include storage devices to store logic and data associated with the programs and services used by the apparatus 100.

In embodiments, the processor 111 may be a central processing unit (CPU). In some embodiments, the processor 111 may be a programmable device that may execute a program, e.g., the system driver 114. In embodiments, the processor 111 may be a microcontroller, a 16-bit processor, a 32-bit processor, a 64-bit processor, a single core processor, a multi-core processor, a digital signal processor, an embedded processor, or any other processor.

In embodiments, the operating system 113 may be any system software that manages hardware or software resources for the apparatus 100, and may provide services to applications, e.g., the system driver 114. The operating system 113 may be Windows®, Android OS, iOS, Linux, a real-time operating system (RTOS), an automotive infotainment operating system, among others. For example, the operating system 113 may be a real-time operating system such as VxWorks, PikeOS, eCos, QNX, MontaVista Linux, RTLinux, Windows CE, or other operating system.

In embodiments, the computer bus 105 may be an external computer bus, an internal computer bus, a serial computer bus, or a parallel computer bus. For example, the computer bus 105 may be a PCI bus, a PCI Extended bus (PCI-X), a PCI express bus, a universal serial bus (USB), a parallel advanced technology attachment (PATA) bus, a serial ATA (SATA) bus, an inter-integrated circuit (I²C) bus, an IEEE 1394 interface (FireWire) bus, a small computer system interface (SCSI) bus, a scalable coherent interface (SCI) bus, or other computer bus.

In embodiments, the device 103 may be any piece of computer hardware. For example, the device 103 may be a network interface card, an audio card, a video controller, an Ethernet controller, a webcam, mouse, a Bluetooth controller, a PCI to ISA bridge, a GUI Accelerator, an ATM Controller, a multimedia card, a SCSI controller, a multimedia device, a MPEG-II Video Decoder, or any input/output device. In embodiments, the device 103 may be a PCI device, which may be plugged directly into a PCI slot on a computer's motherboard. In some other embodiments, the device 103 may be coupled to the processor 111 by a different computer bus.

FIG. 1(b) illustrates the apparatuses 100, the device 101, the device 103, and the computer bus 105 in more details. The device 101 includes an apparatus 110, and the device 103 includes another apparatus 120, where the apparatus 110 and the apparatus 120 are coupled by the computer bus 105. The computer bus 105 may be a communication bus and may include multiple links, e.g., a link 151, and a link 153. The apparatus 110 or the apparatus 120 may be a transmitter, or a receiver to communicate through the computer bus 105. In some embodiments, the apparatus 120 may have substantially similar structure as the apparatus 110. In some other embodiments, the 120 may have a structure different from the apparatus 110.

In embodiments, the apparatus 110 includes a queue 142, and a controller 158 to manage operations of the queue 142. Other components, e.g., a counter 159 may be included in the controller 158. In addition, the apparatus 110 further optionally includes a queue 142, a queue 144 and a queue 146. The one or more queues, e.g., the queue 142, the queue 144, and the queue 146 form a hierarchical queue 140, where the queue 142, the queue 144, and the queue 146 may be of different lengths and used in different ways. The queues respectively include one or more storage spaces. For example, the queue 142 includes a first storage 147, and a second storage 149. The queue 144 includes a storage 154, and the queue 146 includes a storage 156.

In embodiments, a first communicating entity 116 and a second communicating entity 133 may be coupled by the apparatus 110 and the apparatus 120 through the communication bus 105. A first virtual channel 155 of communication is between the first communicating entity 116 to communicate with the second communicating entity 133 via the apparatus 110 and the second apparatus 120 through the communication bus 105. A traffic 121 from the first communicating entity 116 goes through the first virtual channel 155 to arrive at the second communicating entity 133 to be saved as a traffic 135. A traffic, e.g., the traffic 121 or the traffic 135, includes a collection of smaller information units, e.g., a packet 124, to travel through a virtual channel. In some embodiments, communication between the first communicating entity 116 and the second communicating entity 133 may include multiple virtual channels. In some embodiments, the first communicating entity 116 and the second communicating entity 133 are on a same computer.

In addition, a third communicating entity 118 and a fourth communicating entity 134 are coupled by the apparatus 110 and the apparatus 120 through the communication bus 105. A second virtual channel 157 of communication is between the third communicating entity 118 to communicate with the fourth communicating entity 134 via the apparatus 110 and the apparatus 120 through the communication bus 105. A traffic 122 from the third communicating entity 118 goes through the second virtual channel 157 to arrive at the fourth communicating entity 134 to be saved as a traffic 136.

In embodiments, the first virtual channel 155 or the second virtual channel 157 may include multiple links, e.g., the link 151, the link 153, of the communication bus 105. The first virtual channel 155 and the second virtual channel 157 may share some entities in common. For example, the first communicating entity 116 may be the same as the third communicating entity 118, or the second communicating entity 133 may be the same as the fourth communicating entity 134.

A traffic, e.g., the traffic 121, the traffic 122, the traffic 135, or the traffic 136, which may be referred to as a communication traffic, includes a collection of smaller information units, or simply referred to as information. An information or an information unit may include a message, a packet, or a bit information. In addition, an information for the traffic 121 may be for a protocol layer, e.g., a physical layer, a link layer, a transaction layer, a routing layer, a transport layer, or an application layer. An information for the traffic 121 may be for a traffic type, with a flow class, and for a virtual channel of communication between the first communicating entity 116 and the second communicating entity 133. For example, an information of the traffic 121 includes a packet 124, where the packet 124 includes a header 127, a payload 125, and a flow control class 126. The packet 124 may be for a first traffic type that is a data traffic, or for a second traffic type that is a control traffic. The flow control class 126 may include a posted class, a non-posted class, a completion class, a quality of service class, or some other flow class. In some other embodiments, an information may be a message in an application layer, or a bit information in a physical layer.

In embodiments, the queue 142 in the apparatus 110 may be shared by multiple communication traffics. For example, the first storage 147 stores a first information for the traffic 121 with a first traffic type, a first flow class, and for the first virtual channel 155, while the second storage 149 stores a second information for the traffic 122 with a second traffic type, a second flow class, and for the second virtual channel 157. As such, the first traffic type is different from the second traffic type, the first flow class is different from the second flow class, or the first virtual channel is different from the second virtual channel. For example, the traffic 121 is a data traffic and the traffic 122 is a control traffic. The first storage 147 and the second storage 149 are within the queue 142, and managed by a same controller 158. There may be an ordering, e.g., a sequential order, between the first storage 147 and the second storage 149 in the queue 142. For example, the first storage 147 may be accessed earlier than the second storage 149, or a data or information may be stored in the first storage 147 before a data or information is stored in the second storage 149.

In embodiments, the queue 144 or the queue 146 may be used in ways different from the queue 142. Instead of being shared among multiple communication traffics, the queue 144 or the queue 146 may be reserved for a specific kind of traffic, e.g., a third information for a third traffic type, a third flow class, or for a third virtual channel. For example, the queue 144 may be reserved for data traffic, while the queue 146 may be reserved for control traffic. More examples of different organizations of the queue 142, the queue 144, and the queue 146 are shown in FIGS. 2(a)-2(d).

In embodiments, the controller 158 (also referred to as the queue manager) is coupled to the queue, e.g., the queue 142, the queue 144, or the queue 146, to manage operations of the queue. In some embodiments, the controller 158 is arranged to monitor an unused capacity of the queue 142, reserve a plurality of spaces in the queue 142, with each space releasable to store information for a traffic type, with a flow class, and for a virtual channel of communication. In embodiments, the reserved and unreleased spaces are unused spaces. In addition, the controller 158 is arranged to release two of the plurality of spaces for use as the first space 147 and the second space 149. In detail, the controller 158 is to use the counter 159 to perform operations to monitor the unused spaces, set aside an amount of reserved spaces, release a plurality of spaces, based on information in the one or more counters.

Figure 3A:
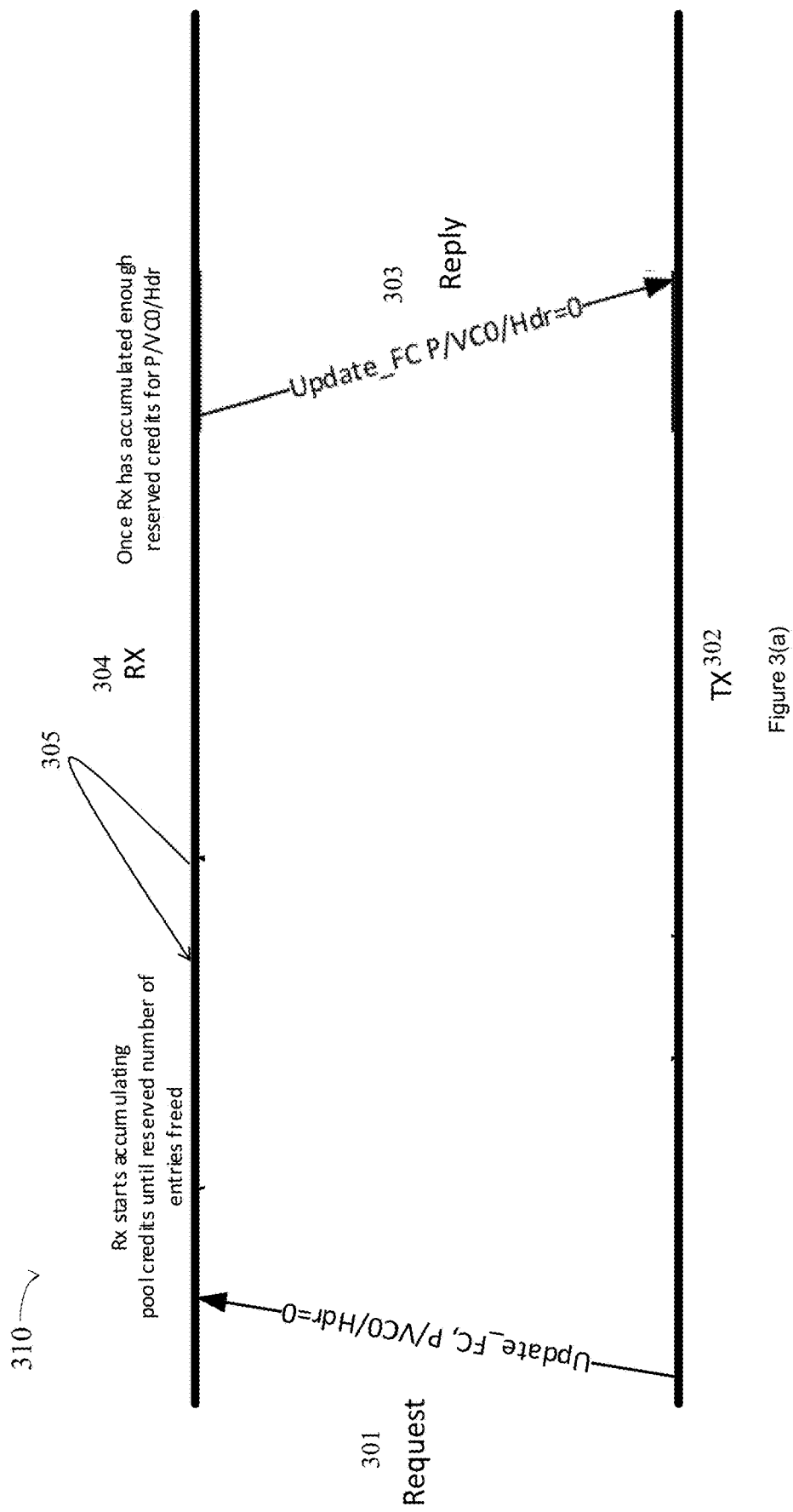
FIGS. 3(a)-3(b) illustrate example protocols between a transmitter and a receiver for resources sharing across multiple communication traffics of different flow-control classes and virtual channels in computer buses, in accordance with various embodiments.
Figure 3B:
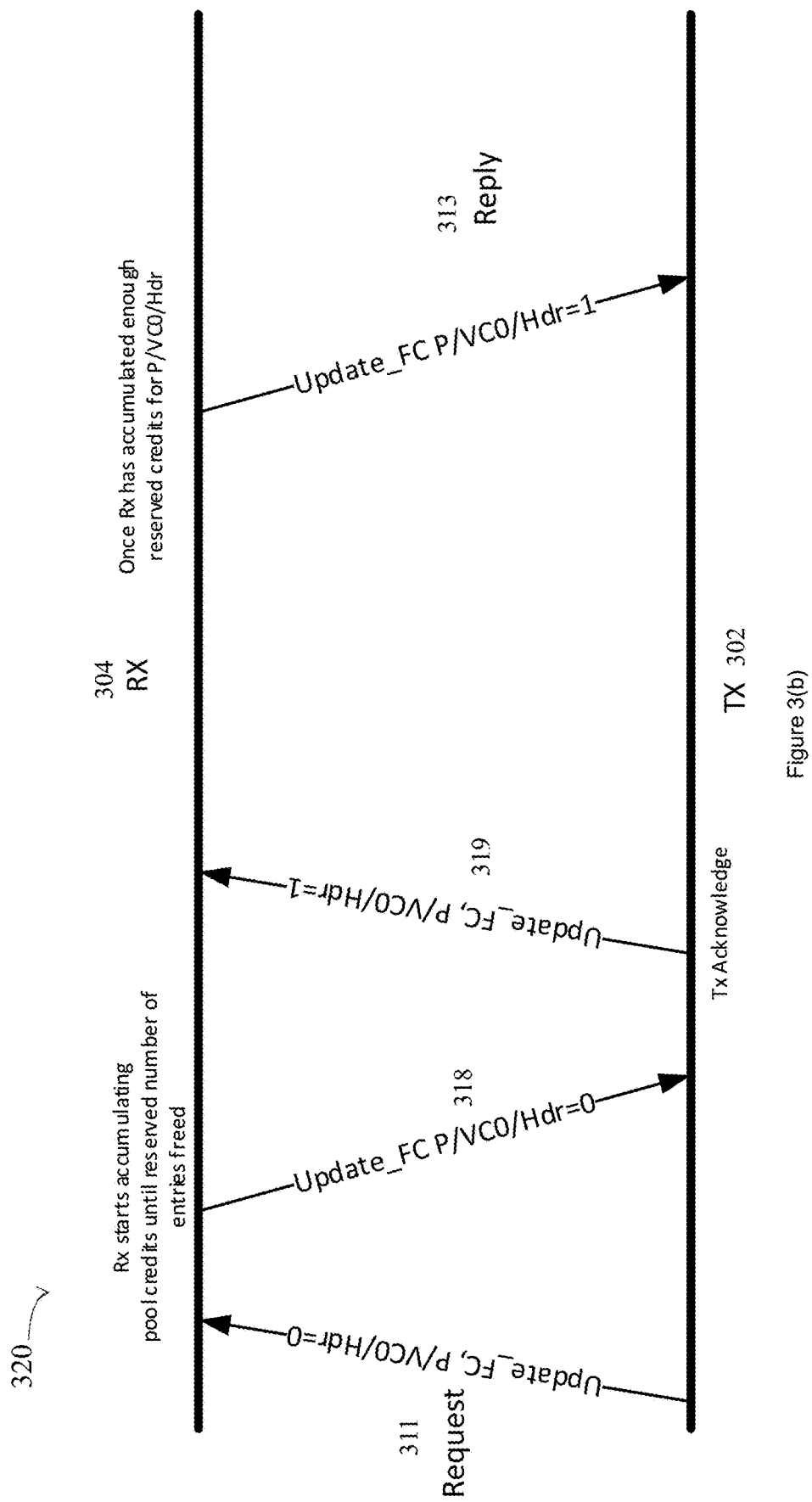

Moreover, the controller 158 is arranged to synchronize a status of the queue 142 with a status of a corresponding queue disposed in the apparatus 120. For example, the controller 158 is send a request to the apparatus 120 for an amount of reserved and unreleased spaces of the queue disposed in the apparatus 120. In addition, the controller 158 is receive, in response to the sent request, an indication that the amount of reserved and unreleased spaces in the queue disposed in the apparatus 120. More details of the controller 158 to synchronize the statuses of the queues are shown in FIGS. 3(a)-3(b).

Figure 4A:
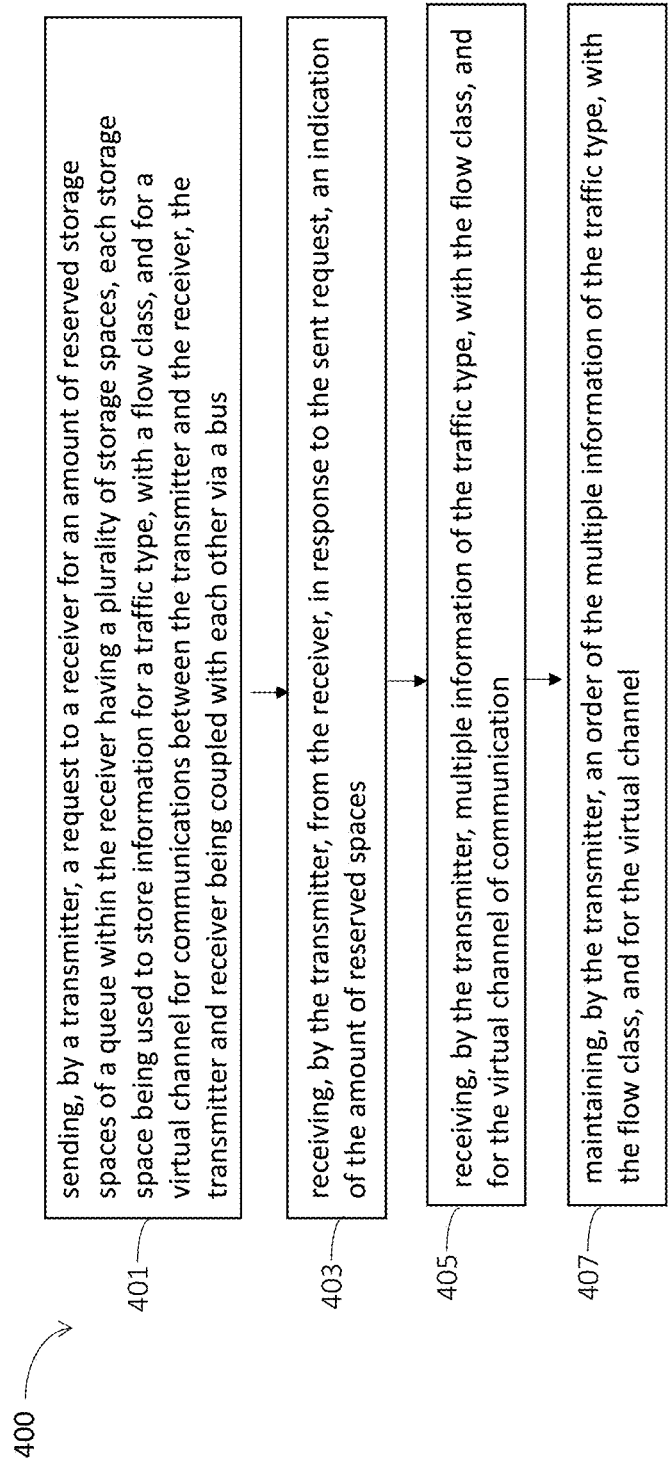
FIGS. 4(a)-4(b) illustrate an example process and data structure for resources sharing across multiple communication traffics of different flow-control classes and virtual channels in computer buses, in accordance with various embodiments.
Figure 4B:
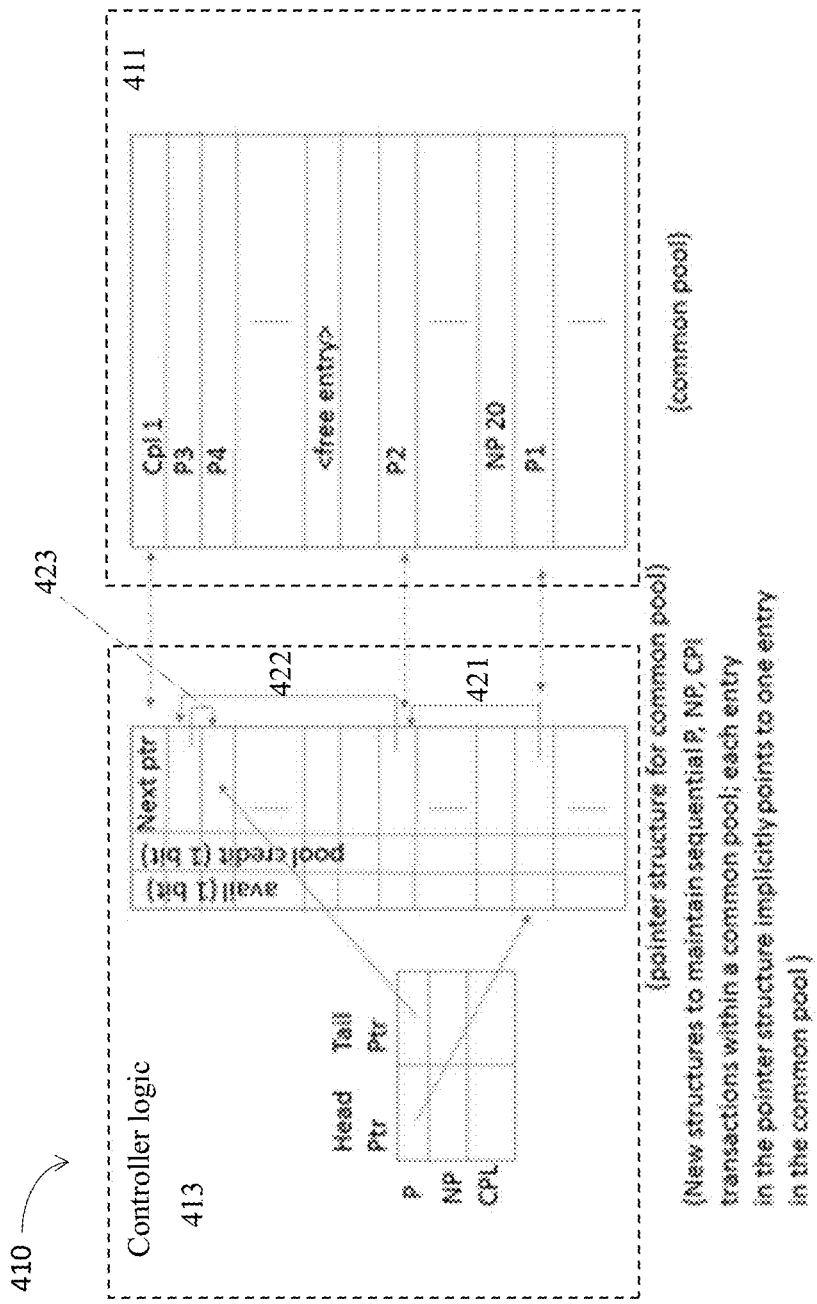

Furthermore, the controller 158 is to receive multiple information of a traffic type, with a flow class, and for a virtual channel of communication, and maintain an order of the multiple information of the traffic type, with the flow class, and for the virtual channel. More details of such operations are shown in FIGS. 4(a)-4(b).

In some embodiments, the first communicating entity 116 or the second communicating entity 133 may include a central processor unit (CPU) or a processor core (or applications/functions operated thereon), a mouse, a disk, a keyboard, a memory device, or an input/output controller. In addition, the first communicating entity 116 and the second communicating entity 133 may be on a same computer. The communication bus 105 may be a PCI bus, a PCI Extended bus (PCI-X), a PCI express bus, a universal serial bus (USB), a parallel advanced technology attachment (PATA) bus, a serial ATA (SATA) bus, an inter-integrated circuit ($I^2C$) bus, an IEEE 1394 interface (FireWire) bus, a small computer system interface (SCSI) bus, a scalable coherent interface (SCI) bus.

In some embodiments, the first communicating entity 116 or the second communicating entity 133 may be a bus agent or link partner disposed on a PCB, and the communication bus 105 may be a selected one of peripheral component interconnect (PCI) bus, a PCI Extended bus (PCI-X), or a PCI express bus. In addition, the apparatus 110 may be a part of the bus agent. In other words, the first communicating entity 116 and the apparatus 110 may be both a part of a bus agent.

FIGS. 2(a)-2(d) illustrate example resources sharing across multiple communication traffics of different flow-control classes and virtual channels in computer buses, in accordance with various embodiments. The mechanisms with various alternatives illustrated in FIGS. 2(a)-2(d) may be applicable to the traffic 121, the traffic 122, and the apparatus 110 coupled to the computer bus 105 shown in FIG. 1(b).

An example of a current existing approach is shown in FIG. 2(a), where a separated queue is used for information of a traffic with a traffic type, a flow class, and for a virtual channel of communication between a first communicating entity to communicate with a second communicating entity. For example, for a first virtual channel, for a control traffic that is indicated by a header (Hdr), a queue 201 is reserved for a flow class that is a posted class (P), a queue 203 is reserved for a flow class that is a non-posted class (NP), and a queue 205 is reserved for a flow class that is a completion class (CPl). Similarly, for a first virtual channel, for a data traffic that is indicated by data, a queue 202 is reserved for a flow class P, a queue 204 is reserved for a flow class NP, and a queue 206 is reserved for a flow class CPl. In addition, for a second virtual channel, for a control traffic that is indicated by a Hdr, a queue 207 is reserved for a flow class P, a queue 208 is reserved for a flow class NP, and a queue 209 is reserved for a flow class Cpl. Similarly, for the second virtual channel, for a data traffic that is indicated by data, a queue 211 is reserved for a flow class P, a queue 212 is reserved for a flow class NP, and a queue 213 is reserved for a flow class Cpl. Accordingly, for a first traffic with a first traffic type, a first flow class, and for a first virtual channel, and a second traffic with a second traffic type, a second flow class, and for a second virtual channel, there will be a first queue for the first traffic and a second queue for a second traffic, if the first traffic type is different from the second traffic type, the first flow class is different from the second flow class, or the first virtual channel is different from the second virtual channel.

As shown in FIG. 2(a), each traffic of a traffic type, with a flow class, and for a virtual channel has its separated queue. In other words, a queue is reserved based on at least three different parameters, a traffic type, a flow class, and a virtual channel. As PCIe data rate keeps increasing, the queue sizes are increasing at a non-linear cadence. The increased queue sizes may be caused by significantly increased latency as the data rate scales, primarily due to the adoption of channel extension devices such as retimers (that add about 100 ns to round-trip per retimer), and the increased bandwidth. Other factors for the increased queue sizes may include the higher partitioning requirement (e.g., a x16 Gen5 is expected to partition up to 8×2s for applications such as storage, whereas in a x16 Gen 4 was expected to partition up to 4×4s; the storage device bandwidth consumption can be satisfied by either a x4 Gen 4 or a x2 Gen 5), the higher max-payload size, and the increased quality of service (QoS) demanded by applications which manifests itself as multiple virtual channels. As bandwidth doubles generationally, the transaction layer storage requirement also doubles. As the latency increases, it has a further multiplicative effect on the queue sizes. As the number of VCs are increased, that also has another multiplicative effect. Sometimes the queue sizes of transaction layer is accounting for about half the area of the entire PCIe controller (physical, link, and transaction layers). However, the queues may have a very low utilization factor. For example, if a link has a very high percentage of VC1 posted writes, it uses up a significant portion of the VC1 P (Posted) queues, but the Cpl (Completion) and NP (Non-Posted) queues in VC1/VC0 as well as the posted queues in VC0 are rarely used. However, each of these queues must be sized assuming 100% of the traffic is targeted for each of these queues, assuming the worst type of traffic (e.g., for headers with very little data, if any, and for data queues assuming the max payload size). While doubling the bandwidth with the same latency, it is reasonable to expect that the overall queue size will double. However, doubling across each flow-control class and VC, the storage size may be increased by an order of magnitude more. Increased queue sizes not only affect the silicon real estate, but also make backend a challenge due to larger partition size. There are also power implications with leakage and active power.

Embodiments herein may share resources, e.g., queue space and VCs across multiple flow-control classes to reduce the total queue size requirement. In other words, a queue in embodiments herein is shared by multiple traffics sharing at least one parameter, e.g., two traffics with a same traffic type, a same flow class, or a same VC. In addition, in PCIe context, the corrupted Data Link Layer Packets (DLLPs) are dropped—hence the mechanisms for credit negotiations and updates may need to be resilient to that. Accordingly, embodiments herein may define robust mechanisms that work across DLLP corruptions/drops to keep communication in sync between the transmitter (Tx, entity sourcing transactions) and the receiver (Rx, entity receiving transactions from Tx and returning credits). As a consequence, embodiments herein may result in lower area, lower chip cost, as well as better feature set and lower power, while delivering full bandwidth. In embodiments, credits may refer to a certain amount of storage spaces in a queue used to store information. Embodiments herein may rely on a common pool of credits, e.g., an amount of storage space in a shared queue, that can be shared across the various flow control (FC) classes, e.g., Posted, Non-Posted and Completion (P/NP/Cpl); traffic types, e.g., Hdr and/or Data; and across different VCs. Even though these flow-control classes share a common pool or a shared queue, PCIe ordering rules may still be enforced across the FC classes per VC, in a same or similar way as in traditional implementations.

In embodiments, as shown in FIG. 2(b), a hierarchical queue including multiple queues may be used to have explicit but minimal P/NP/Cpl Hdr and Data credits along with pooled credits (shared queue) for header and data for each VC separately. In detail, a number of hierarchical queues may be used, two hierarchical queues for each virtual channel. For a VC0, there is a hierarchical queue 214 for control traffic and a hierarchical queue 219 for data traffic. Furthermore, a hierarchical queue, e.g., the hierarchical queue 214, includes a shared queue 215, and separately reserved queues, e.g., a queue 216, a queue 217, and a queue 218, for different flow class. Similarly, for a VCn, there is a hierarchical queue 221 for control traffic and a hierarchical queue 222 for data traffic. Each of the hierarchical queue, e.g., the hierarchical queue 214, the hierarchical queue 219, the hierarchical queue 221, or the hierarchical queue 222, may be similar to the hierarchical queue 140 shown in FIG. 1(b).

In this approach, credits are negotiated, e.g., advertised and released separately for each FC/VC Hdr/Data as well as for the pooled credits in each VC for Hdr/Data. The Data Link Layer Packets (DLLPs) would be enhanced to have the additional encoding for the pooled credits. A variation of this is where the shared pool credits are not advertised explicitly, but rather implicitly managed by the receiver. As soon as a transaction is received for a FC/VC (e.g., P Hdr VC0), if credits, e.g., a number of storage space in a queue, are available from the shared pool or shared queue, the receiver can return the corresponding credit to the transmitter (even though no transaction has popped from its internal queue). In embodiments, the Rx may keep a set of counters that monitor the queue utilization across the requests that are received from the transmitter. When transactions are popped from the Rx queues, it manages whether the credit is being returned to the free pool or the dedicated pool of credits. Since it is tracking the transmitter view of the world in its own counters, it can easily detect if the Tx view of credits is below a minimum threshold for a FC/VC, and in that case credits can be returned to the dedicated pool of the queue. The DLLP mechanisms of returning credits to the Tx remain the same as those existing today.

In embodiments, as shown in FIG. 2(c), a further optimization may be possible where there are explicit P/NP/Cpl Hdr and Data credits for each VC but a common pool of credits, separate for Hdr vs Data, across all the VCs and FC classes. In detail, there may be a hierarchical queue 223 and a hierarchical queue 224 for the apparatus, e.g., the apparatus 110. The hierarchical queue 223 includes a shared queue for control traffic shared among all virtual channels and among all flow classes. In addition, the hierarchical queue 223 includes a separately reserved queue for each virtual channel and a flow class. The hierarchical queue 224 has a similar structure as the hierarchical queue 223. Each of the hierarchical queue, e.g., the hierarchical queue 223, or the hierarchical queue 224, may be similar to the hierarchical queue 140 shown in FIG. 1(b). The credit mechanism for FIG. 2(c) is similar to the approach in FIG. 2(b), except that there are two sets of pooled credits (Hdr and Data) across all VCs. Same extension of abstracting away the shared pool of credits at Rx apply as well.

In embodiments, as shown in FIG. 2(d), it is possible to optimize the pooling approach even further and only provide pooled credits or shared queues, sharable across FC/VC/Hdr vs Data, where Hdr vs Data refers to a traffic type. For example, there may be a queue 231 shared for all control traffic with different flow control class and virtual channels, a queue 232 shared for all data traffic with different flow control class and virtual channels, or a queue 241 shared for all data traffic and control traffic with different flow control class and virtual channels. Each of the queue, e.g., the queue 231, the queue 232, or the queue 241 may be similar to the queue 142 shown in FIG. 1(b). In this approach, to ensure forward progress, each transmitter may ensure that it reserves the minimal credits needed to support the maximum transaction size possible for each FC/VC and not use those credits for any other FC/VC. More detailed operations of the transmitter and the receiver are shown in FIGS. 3(a)-3(b) below.

FIGS. 3(a)-3(b) illustrate example protocols, e.g., a protocol 310, or a protocol 320, between a transmitter (Tx) 302 and a receiver (Rx) 304 for resources sharing across multiple communication traffics of different flow control classes and virtual channels in computer buses, in accordance with various embodiments. The transmitter 302 and the receiver 304 shown in FIGS. 3(a)-3(b) may be an example of the apparatus 110 or the apparatus 120 coupled by the computer bus 105, as shown in FIG. 1(b). The transmitter 302 and the receiver 304 may be referred to as a requestor or an initiator, a link partner, or a bus agent. There may be many different protocols, e.g., pooling mechanisms, for resources sharing across multiple communication traffics of different flow control classes and virtual channels in computer buses, where the protocol 310 or the protocol 320 are merely two examples pooling mechanisms.

In embodiments, as shown in FIG. 3(a), the protocol 310 starts at an interaction 301, where a request is sent, by the transmitter 302, to the receiver 304 for an amount of reserved storage spaces of a queue within the receiver 304. The request sent at the interaction 301 may include information to identify a traffic, e.g., a flow class, a traffic type (Hdr or data), and a virtual channel. The receiver 304 may have a queue similar to the queue 142 shown in FIG. 1(b) having a plurality of storage spaces, each storage space being used to store information for a traffic type, with a flow class, and for a virtual channel for communications between the transmitter 302 and the receiver 304.

In addition, at an interaction 303, the protocol 310 includes receiving, by the transmitter 302, from the receiver 304, in response to the sent request, a reply including an indication of the amount of reserved spaces in the queue of the receiver 304. The reply received at the interaction 303 may include same or similar information to identify the traffic, e.g., the flow class, the traffic type (Hdr or data), and the virtual channel. Optionally, the protocol 310 includes an interaction 305 at which the amount of spaces are reserved in the queue of the receiver 304.

In embodiments, as shown in FIG. 3(b), the protocol 320 illustrates a mechanism to ensure forward progress guarantees are met even if intermediate DLLPs are lost. Explicit handshake between the Tx 302 and the Rx 304 can guarantee reserved storage spaces are available at both the Tx 302 and the Rx 304. According, when a transmitted packet from the Tx 302 is received by the Rx 304, the Rx 304 has space to receive the transmitted packet. As a result, both the Tx 302 and the Rx 304 have corresponding spaces for the transmitted packets. For example, the Tx 304 maintains a dedicated credit counter per FC/VC for Hdr and data separately, and a common pool counters (provided credits for data are reserved as dedicated).

In embodiments, the DLLPs would be extended to include a bit per FC/VC/Hdr vs Data in both Tx and Rx directions. After initialization, the Tx 302 would have reserved a certain number of credits, e.g., storage space in a shared queue, dedicated per FC/VC/Hdr vs Data.

In embodiments, at an interaction 311, a request is transmitted from the Tx 302 to the Rx 304, where the request includes Update_FC DLLPs that have the bits set for all FC/VC/Hdr vs Data. Similarly in any request sent from the Rx 304 to the Tx 302, the Update_FC DLLPs in the request have the same bits set. In embodiments, if at any point Tx 302 uses the dedicate credits for any FC/VC/Hdr/Data to store information for the corresponding FC/VC/Hdr/Data, the Tx 302 will start transmitting Update_FC DLLPs with the corresponding bit de-asserted.

When the Rx 304 receives such a DLLP (without any errors), at interaction 318, the Rx 304 flips the corresponding bit when sending an acknowledgement Update_FC DLLPs to the Tx 302. Hence, at interaction 318, the Rx 304 indicates that the Rx 304 has registered the fact that the Tx 302 used up dedicated credits for that FC/VC/Hdr/Data.

From this point, Rx will monitor for two events, the first one is to make sure that it has enough free space to account for the reserved credits for that FC/VC/Hdr/Data. In embodiments, Rx may accumulate pool credits, e.g., storage spaces in the shared queue, and not return it to the Tx 302. The second event is that the Rx 304 receives an Update_FC DLLP from the Tx 304 with the corresponding bit set, which may be sent at an interaction 319. The second event serves as an acknowledge from the Tx that it saw the Rx Update FC_DLLP de-assertion for the corresponding FC/VC/Hdr/Data. When the second event happens, at interaction 313, the Rx 304 will start transmitting Update_FC DLLPs with the bit set for that FC/VC/Hdr/Data, indicating to Tx that it can now replenish its dedicated credits for that FC/VC/Hdr/Data. The Rx 304 may make sure if multiple FC/VC/Hdr/Data are waiting on dedicated credits, then Rx 304 may make sure that it has freed up enough reserved space for all of them before returning the Update_FC DLLP with the corresponding bits set. If this mechanism is implemented symmetrically for traffic flow in both directions, 1 bit per direction may be used for each FC/VC/Hdr/Data that participates in this flow.

The pooling mechanism may be negotiated between the link partners or bus agents, which may be either the transmitter 302 or the receiver 304, as part of the initial flow-control credit (Init_FC) negotiation immediately after the link trains up. If the link partner does not support pooled credits, then a default credit assignment similar to what is done in the existing approach must be followed. For example, one could do the Init FC handshake giving out the default P/NP/Cpl credits and have a new Init_FC1 encoding with the support for pooling advertised along with the pooled credits as well as how much of each of the P/NP/Cpl credits will be debited to the common pool if the link partner supported credit pooling.

Additionally and alternatively, the requestor (as well as root-ports that assume the role of the requestors for peer-to-peer traffic in the outbound direction) may advertise finite completion credits as long as the initiator of the NP transaction can absorb the NP request and there are no pre-2.1 PCI devices in the hierarchy. Embodiments herein further reduce the burden on the completion queue sizing to just account for the round-trip delay of the credit loop time with its link partner (as opposed to accounting for the system level latency round-trip).

FIGS. 4(a)-4(b) illustrate an example process 400 and data structure 410 for resources sharing across multiple communication traffics of different flow-control classes and virtual channels in computer buses, in accordance with various embodiments. The process 400 and data structure 410 may be used for resources sharing across multiple flow-control class and virtual channels in the computer bus 105, as shown in FIGS. 1(a)-1(b).

The process 400 may start at an interaction 401. During the interaction 401, operations may be performed to send, by a transmitter, a request to a receiver for an amount of reserved storage spaces of a queue within the receiver having a plurality of storage spaces. The transmitter and receiver are coupled with each other via a bus. Each storage space of the queue is used to store information for a traffic type, with a flow class, and for a virtual channel for communications between the transmitter and the receiver. For example, at the interaction 401, operations may be performed by the transmitter 302, to send a request to the receiver 304 for an amount of reserved storage spaces of a queue within the receiver 304 having a plurality of storage spaces, as illustrated in the interaction 301 in FIG. 3(a).

During the interaction 403, operations may be performed to receive, by the transmitter, from the receiver, in response to the sent request, an indication of the amount of reserved spaces. For example, at the interaction 403, operations may be performed to receive, by the transmitter 302, from the receiver 304, in response to the sent request, an indication of the amount of reserved spaces, as illustrated in the interaction 303 in FIG. 3(a).

During the interaction 405, operations may be performed by the transmitter to receive multiple information of the traffic type, with the flow class, and for the virtual channel of communication. During the interaction 407, operations may be performed by the transmitter to maintain an order of the multiple information of the traffic type, with the flow class, and for the virtual channel. Details of the operations for the interaction 407 and the interaction 409 are further illustrated in FIG. 4(b).

In embodiments, as shown in FIG. 4(b), the data structure 410 includes a linked list structures used to enforce transaction ordering, e.g., information ordering, within each FC class. The data structure 410 includes various pointers P1, P2, P3, P4 stored in a shared queue 411, and various control bits implemented in a control logic, which may reside in a controller 413. The four information of a traffic, e.g., posted transactions, that have arrived in a given VC class are P1 followed by P2, P3, and P4 respectively. In some embodiments, P1, P2, P3, and P4 are multiple information of the traffic type, with the flow class, and for the virtual channel of communication received in the interaction 405 of FIG. 4(a). Since the storage allocation is from a common pool, due to fragmentation, it is likely that these transactions occupy non-contiguous entries in a random fashion. During the interaction 407 of FIG. 4(b), various links may be established to maintain an order of the multiple information P1, P2, P3, and P4. For example, the head pointer (Head ptr) points to P1. The "Next ptr" associated with the P1 entry points to the location of P2, as shown in the link 421. The "Next ptr" associated with P2 points to the location of P3, as shown in the link 422. The "Next ptr" associated with P3 points to P4, as shown in the link 423. P4 being the last entry in the P FC class, the "Tail ptr" also points to P4. This ensures that P1, P2, P3, and P4 are processed in that order. A single bit indicates whether the transaction had consumed a pool credit vs a dedicated FC class credit in a hierarchical queue including a dedicated FC class queue and a shared queue with pooled credits. Thus, when P1 is processed and removed from the pool, the "Head ptr" will point to P2 and the credit corresponding to P1 will be either released in the common pool or in the P credit, depending on whether the transmitter had used pool credit or dedicated credit while transmitting P1. A single bit in the transaction layer packet (TLP) may be used to indicate whether the transaction used pool credit or not. In embodiments, the data structure enhancement shown in FIG. 4(b) may also use a single bit denoting whether that common pool entry is occupied by a transaction or is free to be used by an incoming transaction. Hardware consults this list to make space available for incoming transactions. Whenever an entry is released, the pool entry availability is set appropriately and the corresponding credit added to the pool to be released, if appropriate.

Figure 5:
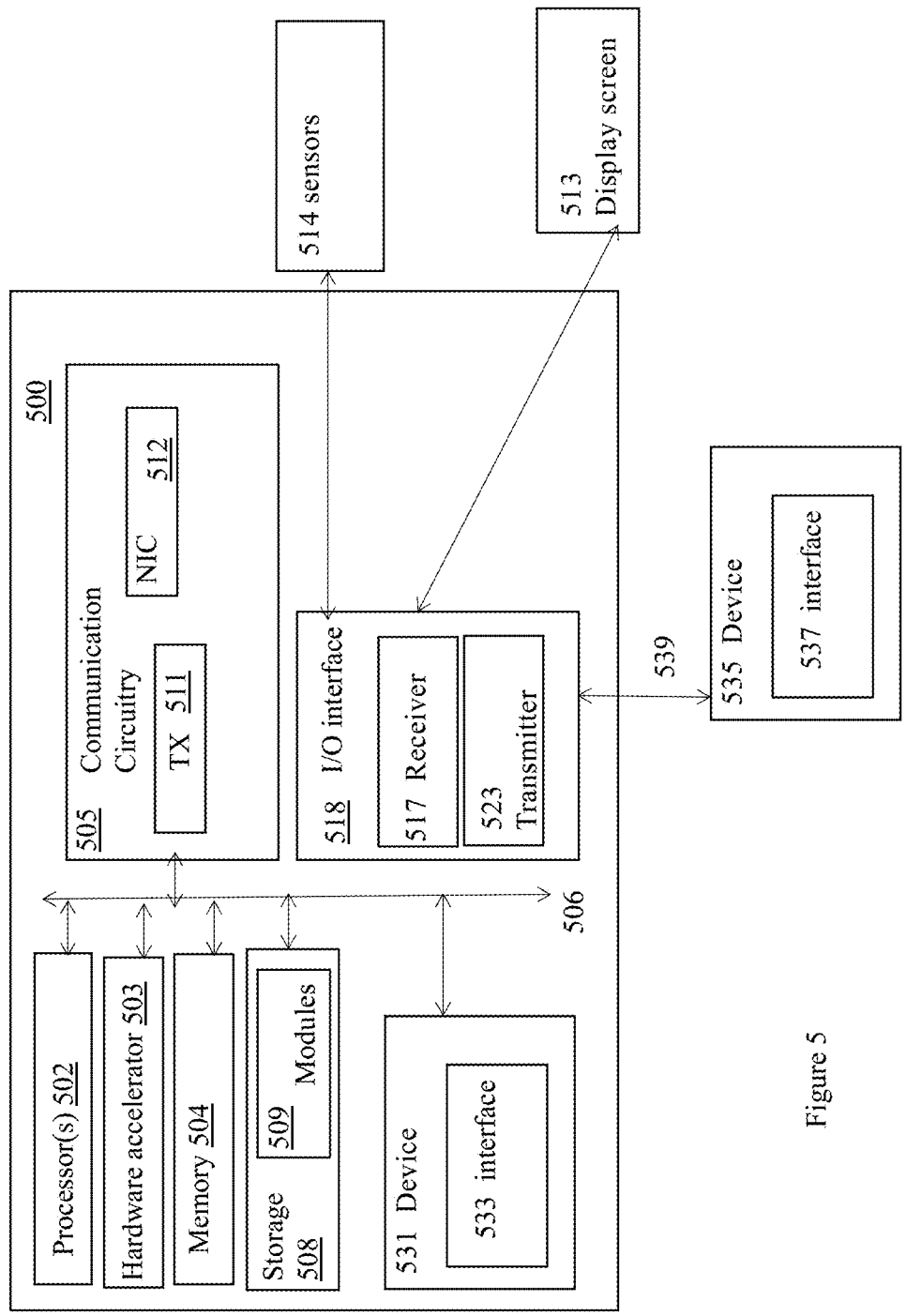
FIG. 5 illustrates an example device suitable for use to practice various aspects of the present disclosure, in accordance with various embodiments.

FIG. 5 illustrates an example device suitable for use to practice various aspects of the present disclosure, in accordance with various embodiments. The device 500 may be incorporated with the shared resource for communication technology of the present disclosure. As shown, the device 500 may include one or more processors 502, each having one or more processor cores, or and optionally, a hardware accelerator 503 (which may be an ASIC or a FPGA). In alternate embodiments, the hardware accelerator 503 may be part of processor 502, or integrated together on a SOC. Additionally, the device 500 may include a memory 504, which may be any one of a number of known persistent storage medium, and a data storage circuitry 508 including modules 509. In addition, the 500 may include an I/O interface 518, coupled to one or more sensors 514, and a display screen 513.

The I/O interface 518 may include a transmitter 523 and a receiver 517. Furthermore, the device 500 may include communication circuitry 505 including a transceiver (Tx) 511, and network interface controller (NIC) 512. The elements may be coupled to each other via system bus 506, which may represent one or more buses. In the case of multiple buses, they may be bridged by one or more bus bridges (not shown). A device 531 may be coupled to the system bus 506, and a device 535 may be coupled to a computer bus 539. The device 531 may include an interface 533, and the device 535 may include an interface 537. In embodiments, the computer bus 506 or the computer bus 539 may be an example of the computer bus 105 as shown in FIGS. 1(a)-1(b), while various devices coupled to the computer bus 506 or the computer bus 539 are examples of the device 101 and the device 103. For example, processor 502, accelerator 503, memory 504, storage 508, the device 531, the device 518, communication circuitry 505, and/or the device 535 may include a queue similar to the queue 142 as shown in FIG. 1(b), and the associated logic/elements to share the spaces within queue 142 for communication, as earlier described.

In embodiments, the processor(s) 502 (also referred to as "processor circuitry 502") may be one or more processing elements configured to perform basic arithmetical, logical, and input/output operations by carrying out instructions. Processor circuitry 502 may be implemented as a standalone system/device/package or as part of an existing system/device/package. The processor circuitry 502 may be one or more microprocessors, one or more single-core processors, one or more multi-core processors, one or more multi-threaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 502 may be a part of a SoC in which the processor circuitry 502 and other components discussed herein are formed into a single IC or a single package. As examples, the processor circuitry 502 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm snapdragon® processor(s); Samsung Exynos® processor(s); and/or the like.

In embodiments, the processor circuitry 502 may include a sensor hub, which may act as a coprocessor by processing data obtained from the one or more sensors 514. The sensor hub may include circuitry configured to integrate data obtained from each of the one or more sensors 514 by performing arithmetical, logical, and input/output operations. In embodiments, the sensor hub may capable of timestamping obtained sensor data, providing sensor data to the processor circuitry 502 in response to a query for such data, buffering sensor data, continuously streaming sensor data to the processor circuitry 502 including independent streams for each sensor of the one or more sensors 514, reporting sensor data based upon predefined thresholds or conditions/triggers, and/or other like data processing functions.

In embodiments, the memory 504 (also referred to as "memory circuitry 504" or the like) may be circuitry configured to store data or logic for operating the computer device 500. The memory circuitry 504 may include number of memory devices may be used to provide for a given amount of system memory. As examples, the memory circuitry 504 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 504 may include one or more mass-storage devices, such as a solid state disk drive (SSDD); flash memory cards, such as SD cards, microSD cards, xD picture cards, and the like, and USB flash drives; on-die memory or registers associated with the processor circuitry 502 (for example, in low power implementations); a micro hard disk drive (HDD); three dimensional cross-point (3D XPOINT) memories from Intel® and Micron®, etc.

Where FPDs are used, the processor circuitry 502 and memory circuitry 504 (and/or data storage circuitry 508) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 502 to implement various logic functions. The memory cells may include any combination of various levels of memory/storage including, but not limited to, EPROM, EEPROM, flash memory, SRAM, anti-fuses, etc.

In embodiments, the data storage circuitry 508 (also referred to as "storage circuitry 508" or the like), with shared or respective controllers, may provide for persistent storage of information such as modules 509, operating systems, etc. The data storage circuitry 508 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 502; hard disk drives (HDDs); micro HDDs; resistance change memories; phase change memories; holographic memories; or chemical memories; among others. As shown, the data storage circuitry 508 is included in the computer device 500; however, in other embodiments, the data storage circuitry 508 may be implemented as one or more devices separated from the other elements of computer device 500.

In some embodiments, the data storage circuitry 508 may include an operating system (OS) (not shown), which may be a general purpose operating system or an operating system specifically written for and tailored to the computer device 500. The OS may include one or more drivers, libraries, and/or application programming interfaces (APIs), which provide program code and/or software components for modules 509 and/or control system configurations to control and/or obtain/process data from the one or more sensors 514.

The modules 509 may be software modules/components used to perform various functions of the computer device 500. In embodiments where the processor circuitry 502 and memory circuitry 504 includes hardware accelerators (e.g., FPGA cells, the hardware accelerator 503) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 509 may comprise logic for the corresponding entities discussed with regard to the display screen 513, the transmitter 523, and the receiver 517.

The components of computer device 500 may communicate with one another over the bus 506. The bus 506 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 506 may be a controller area network (CAN) bus system, a Time-Trigger Protocol (TTP) system, or a FlexRay system, which may allow various devices (e.g., the one or more sensors 514, etc.) to communicate with one another using messages or frames.

The communications circuitry 505 may include circuitry for communicating with a wireless network or wired network. For example, the communication circuitry 505 may include transceiver (Tx) 511 and network interface controller (NIC) 512. Communications circuitry 505 may include one or more processors (e.g., baseband processors, modems, etc.) that are dedicated to a particular wireless communication protocol.

NIC 512 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 512 may be included to allow connect to a second network (not shown) or other devices, for example, a first NIC 512 providing communications to the network over Ethernet, and a second NIC 512 providing communications to other devices over another type of network, such as a personal area network (PAN) including a personal computer (PC) device. In some embodiments, the various components of the device 500, such as the one or more sensors 514, etc. may be connected to the processor(s) 502 via the NIC 512 as discussed above rather than via the I/O circuitry 518 as discussed infra.

The Tx 511 may include one or more radios to wirelessly communicate with a network and/or other devices. The Tx 511 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 500. In some embodiments, the various components of the device 500, such as the one or more sensors 514, etc. may be connected to the device 500 via the Tx 511 as discussed above rather than via the I/O circuitry 518 as discussed infra. In one example, the one or more sensors 514 may be coupled with device 500 via a short range communication protocol.

The Tx 511 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10) , 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 518 may include circuitry, such as an external expansion bus (e.g., Universal Serial Bus (USB), FireWire, Thunderbolt, PCI/PCIe/PCIx, etc.), used to connect computer device 500 with external components/devices, such as one or more sensors 514, etc. I/O interface circuitry 518 may include any suitable interface controllers and connectors to interconnect one or more of the processor circuitry 502, memory circuitry 504, data storage circuitry 508, communication circuitry 505, and the other components of computer device 500. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 506), ports, slots, jumpers, interconnect modules, receptacles, modular connectors, etc. The I/O circuitry 518 may couple the device 500 with the one or more sensors 514, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 514 may be any device configured to detect events or environmental changes, convert the detected events into electrical signals and/or digital data, and transmit/send the signals/data to the computer device 500. Some of the one or more sensors 514 may be sensors used for providing computer-generated sensory inputs. Some of the one or more sensors 514 may be sensors used for motion and/or object detection. Examples of such one or more sensors 514 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 514 may include a lens-less image capture mechanism comprising an array of aperture elements, wherein light passing through the array of aperture elements define the pixels of an image. In embodiments, the motion detection one or more sensors 514 may be coupled with or associated with light generating devices, for example, one or more infrared projectors to project a grid of infrared light onto a scene, where an infrared camera may record reflected infrared light to compute depth information.

Some of the one or more sensors 514 may be used for position and/or orientation detection, ambient/environmental condition detection, and the like. Examples of such one or more sensors 514 may include, inter alia, microelectromechanical systems (MEMS) with piezoelectric, piezoresistive and/or capacitive components, which may be used to determine environmental conditions or location information related to the computer device 500. In embodiments, the MEMS may include 3-axis accelerometers, 3-axis gyroscopes, and/or magnetometers. In some embodiments, the one or more sensors 514 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 502, the hardware accelerator 503, the memory 504, the data storage circuitry 508 including the modules 509, the input/output interface 518, the one or more sensors 514, the communication circuitry 505 including the Tx 511, the NIC 512, the system bus 506, the computer bus 539, the device 531, the device 535, may perform its conventional functions known in the art. In addition, they may be employed to store and host execution of programming instructions implementing the operations associated with resources sharing across multiple flow-control class and virtual channels in computer buses, as described in connection with FIGS. 1-4, and/or other functions that provides the capability of the embodiments described in the current disclosure. The various elements may be implemented by assembler instructions supported by processor(s) 502 or high-level languages, such as, for example, C, that can be compiled into such instructions. Operations associated with the device 500 not implemented in software may be implemented in hardware, e.g., via hardware accelerator 503.

The number, capability and/or capacity of these elements 502-539 may vary, depending on the number of other devices the device 500 is configured to support. Otherwise, the constitutions of elements 502-539 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 6:
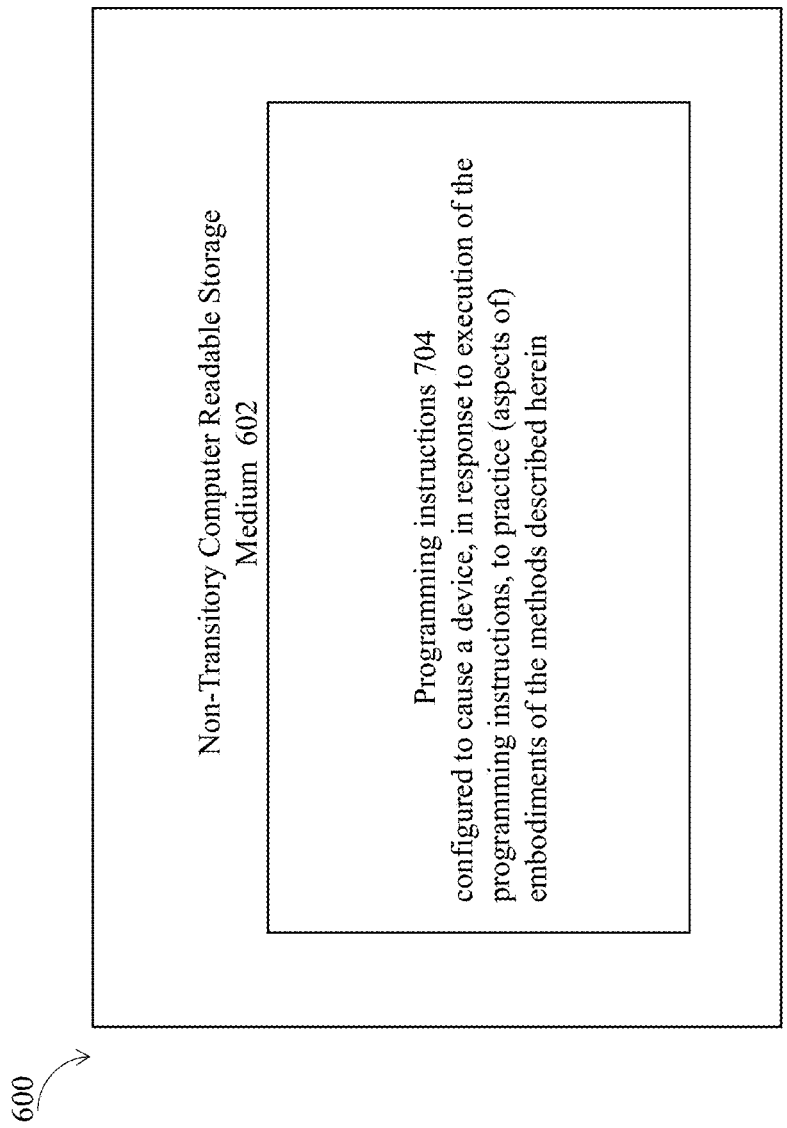
FIG. 6 illustrates a storage medium having instructions for practicing methods described with references to FIGS. 1-5, in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., device 600, in response to execution of the programming instructions, to perform, e.g., various operations associated with resources sharing across multiple flow-control class and virtual channels in computer buses, as shown in FIGS. 1-5.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

EXAMPLES

Example 1 may include an apparatus for communication, comprising: a queue with a plurality of storage spaces, wherein the queue includes a first space to store a first information for a first traffic type, with a first flow class, and for a first virtual channel of communication between a first communicating entity to communicate with a second communicating entity via the apparatus and another apparatus coupled with the apparatus via a communication bus, and a second space to store a second information for a second traffic type, with a second flow class, and for a second virtual channel of communication between a third communicating entity communicating with a fourth communicating entity via the two apparatuses, and wherein the first traffic type is different from the second traffic type, the first flow class is different from the second flow class, or the first virtual channel is different from the second virtual channel; and a controller and coupled to the queue to manage operations of the queue.

Example 2 may include the apparatus of example 1 and/or some other examples herein, wherein the first traffic type or the second traffic type includes a data traffic or a control traffic; and wherein the first flow class or the second flow class includes a posted class, a non-posted class, a completion class, or a quality of service class.

Example 3 may include the apparatus of example 1 and/or some other examples herein, wherein one of the first or the second communicating entity and one of the third or the fourth communicating entity are the same communicating entity.

Example 4 may include the apparatus of example 1 and/or some other examples herein, wherein the first virtual channel or the second virtual channel includes multiple links of the communication bus.

Example 5 may include the apparatus of example 1 and/or some other examples herein, wherein communication between the first communicating entity and the second communicating entity includes multiple virtual channels.

Example 6 may include the apparatus of example 1 and/or some other examples herein, wherein the queue is a first queue, and wherein the apparatus further includes a second queue, and wherein the second queue is reserved to store a third information for a third traffic type, a third flow class, or for a third virtual channel for communication via the communication bus between a fifth communicating entity and a sixth communicating entity.

Example 7 may include the apparatus of example 6 and/or some other examples herein, wherein the first queue is for data traffic, and the second queue is for control traffic.

Example 8 may include the apparatus of example 1 and/or some other examples herein, wherein to manage operations of the queue, the controller is arranged to: monitor an unused capacity of the queue; reserve a plurality of spaces, with each space releasable to store information for a traffic type, with a flow class, and for a virtual channel of communication; release two of the plurality of spaces for use as the first space and the second space; or synchronize a status of the queue with a status of a corresponding queue disposed in the other apparatus.

Example 9 may include the apparatus of example 8 and/or some other examples herein, wherein the reserved and unreleased spaces are unused spaces, and the apparatus further comprises: one or more counters, wherein the controller is to perform operations to monitor the unused spaces, set aside an amount of reserved spaces, release two of the plurality of spaces, or synchronize the statuses of the queues, based on information in the one or more counters.

Example 10 may include the apparatus of example 8 and/or some other examples herein, wherein the controller is further arranged to: send a request to the other apparatus for an amount of reserved and unreleased spaces of the queue disposed in the other apparatus.

Example 11 may include the apparatus of example 10 and/or some other examples herein, wherein the controller is further arranged to: receive, in response to the sent request, an indication that the amount of reserved and unreleased spaces in the queue disposed in the other apparatus.

Example 12 may include the apparatus of example 10 and/or some other examples herein, wherein the controller is further arranged to: receive multiple information of a traffic type, with a flow class, and for a virtual channel of communication; and maintain an order of the multiple information of the traffic type, with the flow class, and for the virtual channel.

Example 13 may include the apparatus of example 1 and/or some other examples herein, wherein the apparatus includes a transmitter, or a receiver; and wherein the first communicating entity or the second communicating entity includes a central processor unit (CPU), a processor core, a mouse, a disk, a keyboard, a memory device, or an input/output controller, and wherein the first communicating entity and the second communicating entity are on a same computer.

Example 14 may include the apparatus of example 1 and/or some other examples herein, wherein the first information or the second information includes a message, a packet, or a bit information for a protocol layer selected from a physical layer, a link layer, a transaction layer, a routing layer, a transport layer, or an application layer.

Example 15 may include the apparatus of example 1 and/or some other examples herein, wherein the communication bus is a PCI bus, a PCI Extended bus (PCI-X), a PCI express bus, a universal serial bus (USB), a parallel advanced technology attachment (PATA) bus, a serial ATA (SATA) bus, an inter-integrated circuit ($I^2C$) bus, an IEEE 1394 interface (FireWire) bus, a small computer system interface (SCSI) bus, a scalable coherent interface (SCI) bus.

Example 16 may include a method for communication, comprising: sending, by a transmitter, a request to a receiver for an amount of reserved storage spaces of a queue within the receiver having a plurality of storage spaces, each storage space being used to store information for a traffic type, with a flow class, and for a virtual channel for communications between the transmitter and the receiver, the transmitter and receiver being coupled with each other via a bus; and receiving, by the transmitter, from the receiver, in response to the sent request, an indication of the amount of reserved spaces.

Example 17 may include the method of example 16 and/or some other examples herein, further comprising: sending, by the transmitter, an indication to the receiver to indicate that the amount of spaces has been reserved in a queue disposed in the transmitter to store information for the traffic type, with the flow class, and for the virtual channel for communications between the transmitter and the receiver.

Example 18 may include the method of example 17 and/or some other examples herein, further comprising: monitoring, by the transmitter, an unused capacity of the queue disposed in the transmitter; or synchronizing, by the transmitter, a status of the queue disposed in the transmitter with a status of the queue disposed in the receiver.

Example 19 may include the method of example 16 and/or some other examples herein, further comprising: receiving, by the transmitter, multiple information of the traffic type, with the flow class, and for the virtual channel of communication; and maintaining, by the transmitter, an order of the multiple information of the traffic type, with the flow class, and for the virtual channel.

Example 20 may include the method of example 16 and/or some other examples herein, wherein the transmitter or the receiver includes a central processor unit (CPU), a processor core, a mouse, a disk, a keyboard, a memory device, or an input/output controller, and wherein the bus is a PCI bus, a PCI Extended bus (PCI-X), a PCI express bus, a universal serial bus (USB), a parallel advanced technology attachment (PATA) bus, a serial ATA (SATA) bus, an inter-integrated circuit ($I^2C$) bus, an IEEE 1394 interface (Fire- Wire) bus, a small computer system interface (SCSI) bus, a scalable coherent interface (SCI) bus.

Example 21 may include an apparatus for computing, comprising: a printed circuit board (PCB) having a selected one of peripheral component interconnect (PCI) bus, a PCI Extended bus (PCI-X), or a PCI express bus; a first bus agent disposed on the PCB, and coupled to the bus; a second bus agent disposed on the PCB, and coupled to the bus, and wherein at least a select one of the first or the second bus agent includes: a queue with a plurality of storage spaces that includes a first space to store a first information for a first traffic type, with a first flow class, and for a first virtual channel of communication between the first and second bus agents, and a second space to store a second information for a second traffic type, with a second flow class, and for a second virtual channel of communication between the first and second bus agents, wherein the first traffic type is different from the second traffic type, the first flow class is different from the second flow class, or the first virtual channel is different from the second virtual channel; and a controller coupled to the queue to manage operations of the queue.

Example 22 may include the apparatus of example 21 and/or some other examples herein, wherein the queue is a first queue, and wherein the selected one of the first or the second bus agent further includes a second queue, and wherein the second queue is reserved to store a third information for a third traffic type, a third flow class, or for a third virtual channel for communication between the first and second bus agents via the computer bus.

Example 23 may include the apparatus of example 21 and/or some other examples herein, wherein to manage operations of the queue, the controller is arranged to: monitor an unused capacity of the queue; or reserve a plurality of spaces, with each space releasable to store information for a third traffic type, with a third flow class, and for a third virtual channel of communication.

Example 24 may include the apparatus of example 21 and/or some other examples herein, wherein the controller is further arranged to: receive multiple information of the first or second traffic type, with the first or second flow class, and for the first or second virtual channel of communication; and maintain an order of the multiple information of the first or second traffic type, with the first or second flow class, and for the first or second virtual channel.

Example 25 may include the apparatus of example 21 and/or some other examples herein, wherein the first traffic type or the second traffic type includes a data traffic or a control traffic; and wherein the first flow class or the second flow class includes a posted class, a non-posted class, a completion class, or a quality of service class.

Example 26 may include an apparatus comprising: means for managing resources sharing across multiple flow-control class and virtual channels in computer buses.

Example 27 may include the apparatus of example 26 and/or some other examples herein, wherein the resource sharing includes sharing queue space and VCs across multiple flow-control classes.

Example 28 may include an apparatus comprising means to perform one or more elements of a method described in or related to any of examples herein, or any other method or process described herein.

Example 29 may include one or more non-transitory computer-readable media comprising instructions to cause an electronic device, upon execution of the instructions by one or more processors of the electronic device, to perform one or more elements of a method described in or related to any of examples herein, or any other method or process described herein.

Example 30 may include an apparatus comprising logic, modules, or circuitry to perform one or more elements of a method described in or related to any of examples herein, or any other method or process described herein.

Example 31 may include a method, technique, or process as described in or related to any of examples herein, or portions or parts thereof.

Example 32 may include an apparatus comprising: one or more processors and one or more computer readable media comprising instructions that, when executed by the one or more processors, cause the one or more processors to perform the method, techniques, or process as described in or related to any of examples herein, or portions thereof.

Example 33 may include a signal as described in or related to any of examples herein, or portions or parts thereof.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus for communication, comprising:
   an hierarchical queue structure having at least a first pair of hierarchical queues to store first information of a first virtual channel of a communication bus and a second pair of hierarchical queues to store second information of a second virtual channel of the communication bus, the first and second virtual channels being different virtual channels;
   wherein the first pair of hierarchical queues include a first plurality of queues to store the first information that is of a first traffic type, and a second plurality of queues to store the first information that is of a second traffic type, the first and second traffic types being different traffic types;
   wherein the second pair of hierarchical queues include a third plurality of queues to store the second information that is of the first traffic type, and a fourth plurality of queues to store the second information that is of the second traffic type;
   wherein at least one of the first, second, third or fourth plurality of queues includes at least a shared queue having a first plurality of spaces to store the first or second information that is of any one of a first plurality of flow classes, and a second non-shared queue having a second plurality of spaces dedicated to store the first or second information that is of a second flow class, the first plurality of flow classes and the second flow class being different flow classes; and
   a controller coupled to the hierarchical queue structure to manage operations of the first, second, third and fourth plurality of hierarchical queues.

2. The apparatus of claim 1, wherein the first traffic type is a data traffic type, and the second traffic type is a control traffic type; and wherein the first plurality of flow classes include a posted class, a non-posted class, and a completion class.

3. The apparatus of claim 1, wherein the first virtual channel or the second virtual channel includes multiple links.

4. The apparatus of claim 1, wherein the first traffic type is a data traffic type, and the second traffic type is a control traffic type.

5. The apparatus of claim 1, wherein to manage operations of the first, second, third and fourth plurality of hierarchical queues, the controller is arranged to:
monitor an amount of unused spaces of each of the first, second, third and fourth plurality of queues;
reserve one or more of the unused spaces for a flow class of a traffic type of the first or second virtual channel;
release one or more of the reserved spaces for use to store information of a flow class of a traffic type of a virtual channel for which the spaces being released were reserved; or
synchronize a status of one of the first, second, third and fourth plurality of queues with a status of a corresponding queue disposed in an apparatus at an another end of the communication bus.

6. The apparatus of claim 5, further comprising:
one or more counters, wherein the controller is to perform operations to monitor the amount of unused spaces, reserve one or more of the unused spaces, release one or more of the reserved spaces, or synchronize the status with the corresponding queue, based on information in the one or more counters.

7. The apparatus of claim 5, wherein the controller is further arranged to:
send a request to another apparatus for an amount of reserved space of a corresponding one of the first, second, third and fourth plurality of queues disposed in the other apparatus.

8. The apparatus of claim 7, wherein the controller is further arranged to:
receive, in response to the sent request, an indication that the amount of reserved spaces in the corresponding one of the first, second, third and fourth plurality of queues is disposed in the other apparatus.

9. The apparatus of claim 7, wherein the controller is further arranged to:
receive multiple information of a traffic type, with a flow class, for the first or second virtual channels; and
maintain an order of the multiple information of the traffic type, with the flow class, for the first and second virtual channels.

10. The apparatus of claim 1, wherein the apparatus further includes a transmitter or a receiver having the hierarchical queue structure and the controller.

11. The apparatus of claim 1, wherein the first information or the second information includes a message, a packet, or a bit information for a protocol layer selected from a physical layer, a link layer, a transaction layer, a routing layer, a transport layer, or an application layer.

12. The apparatus of claim 1, wherein the communication bus is a PCI bus, a PCI Extended bus (PCI-X), a PCI express bus, a universal serial bus (USB), a parallel advanced technology attachment (PATA) bus, a serial ATA (SATA) bus, an inter-integrated circuit ($I^2C$) bus, an IEEE 1394 interface (FireWire) bus, a small computer system interface (SCSI) bus, or a scalable coherent interface (SCI) bus.

13. A method for communication, comprising:
sending, by a transmitter, a request to a receiver for an amount of reserved storage spaces of a queue within the receiver having a plurality of storage spaces, each storage space being used to store information for a traffic type, with a flow class, and for a virtual channel for communications between the transmitter and the receiver, the transmitter and receiver being coupled with each other via a bus;
receiving, by the transmitter, from the receiver, in response to the sent request, an indication of the amount of reserved spaces; and
sending, by the transmitter, an indication to the receiver to indicate that the amount of spaces has been reserved in a queue disposed in the transmitter to store information for the traffic type, with the flow class, and for the virtual channel for communications between the transmitter and the receiver.

14. The method of claim 13, further comprising:
monitoring, by the transmitter, an unused capacity of the queue disposed in the transmitter; or
synchronizing, by the transmitter, a status of the queue disposed in the transmitter with a status of the queue disposed in the receiver.

15. The method of claim 13, further comprising:
receiving, by the transmitter, multiple information of the traffic type, with the flow class, and for the virtual channel of communication; and
maintaining, by the transmitter, an order of the multiple information of the traffic type, with the flow class, and for the virtual channel.

16. The method of claim 13, wherein the transmitter or the receiver includes a central processor unit (CPU), a processor core, a mouse, a disk, a keyboard, a memory device, or an input/output controller, and wherein the bus is a PCI bus, a PCI Extended bus (PCI-X), a PCI express bus, a universal serial bus (USB), a parallel advanced technology attachment (PATA) bus, a serial ATA (SATA) bus, an inter-integrated circuit ($I^2C$) bus, an IEEE 1394 interface (FireWire) bus, or a small computer system interface (SCSI) bus, or a scalable coherent interface (SCI) bus.

17. An apparatus for computing, comprising:
a printed circuit board (PCB) having a selected one of peripheral component interconnect (PCI) bus, a PCI Extended bus (PCI-X), or a PCI express bus;
a first bus agent disposed on the PCB, and coupled to the bus;
a second bus agent disposed on the PCB, and coupled to the bus, and
wherein at least a select one of the first or the second bus agent includes:
a queue with a plurality of storage spaces that includes a first space to store a first information for a first traffic type, with a first flow class, and for a first virtual channel of communication between the first and second bus agents, and a second space to store a second information for a second traffic type, with a second flow class, and for a second virtual channel of communication between the first and second bus agents, wherein the first traffic type is different from the second traffic type, the first flow class is different from the second flow class, or the first virtual channel is different from the second virtual channel; and
a controller coupled to the queue to manage operations of the queue;
wherein to manage operations of the queue, the controller is arranged to:
monitor an unused capacity of the queue; or
reserve a plurality of spaces, with each space releasable to store information for a third traffic type, with a third flow class, and for a third virtual channel of communication.

18. The apparatus of claim 17, wherein the queue is a first queue, and wherein the selected one of the first or the second bus agent further includes a second queue, and wherein the second queue is reserved to store a third information for a third traffic type, a third flow class, or for a third virtual channel for communication between the first and second bus agents via a computer bus.

19. The apparatus of claim 17, wherein the controller is further arranged to:
- receive multiple information of the first or second traffic type, with the first or second flow class, and for the first or second virtual channel of communication; and
- maintain an order of the multiple information of the first or second traffic type, with the first or second flow class, and for the first or second virtual channel.

20. The apparatus of claim 17, wherein the first traffic type or the second traffic type includes a data traffic or a control traffic; and wherein the first flow class or the second flow class includes a posted class, a non-posted class, a completion class, or a quality of service class.

* * * * *